Patented Nov. 24, 1953

2,660,532

UNITED STATES PATENT OFFICE 2,660,532

NEUTRON ABSORBING GLASS

Laben M. Melnick, Hurd W. Safford, Kuan-Han Sun, and Alexander Silverman, Pittsburgh, Pa.

No Drawing. Application January 29, 1952,
Serial No. 268,928

8 Claims. (Cl. 106—52)

This invention relates to glasses for absorbing nuclear radiation, more particularly to glasses for absorbing neutrons, especially of the slow, or low energy, type.

Heretofore the common practice has been to use such opaque materials as thick concrete blocks, metallic cadmium or boron steels for neutron shields. The disadvantages of such materials are well known, especially the inability to see beyond the shield. Glasses are known that possess the capability of absorbing neutrons but such known types have not been satisfactory or used to any extent because they are relatively unstable, as to attack by moisture, or because they require the use of highly expensive or rare elements in large amounts.

It is among the objects of this invention to provide glasses for absorbing neutrons, especially of the slow or thermal type, which may be made from readily available and relatively inexpensive ingredients, which may be melted easily by ordinary glass making procedures, which are of adequate chemical durability, and which are not only clear but also are colorless or only slightly colored.

A particular object is to provide glasses in accordance with the foregoing object which have a relatively high cadmium equivalent, which is defined as the thickness of cadmium equivalent in neutron absorption to the unit thickness of glass.

Still another object is to provide glasses that do not discolor easily under intense neutron bombardment.

Other objects will be recognized from the following description.

Although a common mode of expressing glass compositions is in weight per cent, such compositions may be described on the basis of cationic per cent, i. e., in terms of the relative number of positive atoms, or "cations," which basis has significant meaning. Thus, the cationic per cent of an oxide in a glass is the same as its molecular or formula percentage when all of the oxides are expressed in terms of the simple empirical formula $RO_x$, where R is always unity and $x$ varies as the case may be. For example, the oxides $CdO$, $B_2O_3$, $SiO_2$, and $Al_2O_3$ are expressed on the cationic basis as $CdO$, $BO_{1.5}$, $SiO_2$, and $AlO_{1.5}$. This system of notation affords a simple and logical substitution and comparison of one cation for another, and it has identical significance with the conventional mode of identifying oxides, which is likewise empirical.

We have discovered, and it is upon this that our invention is largely predicated, that glasses in accordance with its stated objects comprise essentially, by analysis and in weight per cent, from about 1 to 67 per cent of cadmium oxide ($CdO$), from about 40 to 0 per cent of boron oxide ($B_2O_3$ or $BO_{1.5}$), and from about 6 to 28 per cent of silica ($SiO_2$). Desirably there is used also from about 8 to about 29 per cent of calcium fluoride ($CaF_2$) to render the melting easier.

The glasses may contain a minor proportion of other constituents, generally not over about 5 per cent, in terms of oxides as is the practice in reporting glass analyses. Thus, for most purposes it is preferable to include about 1 to about 1.5 per cent of alumina ($Al_2O_3$) to repress devitrification. Magnesium oxide ($MgO$) or beryllium oxide ($BeO$) might be used in place of alumina for the same purpose. Similarly, the alumina might be replaced by gadolinium oxide ($Gd_2O_3$ or $GdO_{1.5}$) or indium oxide ($In_2O_3$ or $InO_{1.5}$) and with especial benefit to the neutron absorbing power of our glasses. Likewise, and with benefit to the neutron absorbing characteristics, the glasses of this invention may desirably contain such similarly small amounts of oxides of the lanthanide, or rare earth, series that possess good neutron capturing properties. Such minor components should, for most purposes, be in amounts that do not cause appreciable coloration of the glass, or which do not cause permanent adverse effects when the glass is exposed to neutron radiation. Thus titania ($TiO_2$) should be avoided because it tends to cause serious blackening of the glass under exposure to neutrons. Similarly, oxides of gold and rhodium tend to impart objectionable color to the glass and thus to reduce its optical transparency.

Within the foregoing ranges of composition, it is preferred that the content of cadmium oxide be increased as the content of boron oxide is decreased, and vice versa. Likewise, we now believe that the most satisfactory glasses are those which contain a total of cadmium and boron oxides ranging from 50 to 78 cationic per cent.

As further exemplifying our invention, reference may be made to glasses that have been produced from the following batches in which the cadmium oxide was supplied in the form of the carbonate ($CdCO_3$) in an amount to supply the specified amount of CdO, while the silica, alumina and boron oxide were supplied as such.

|  | No. 1 | | No. 2 | | No. 3 | | No. 4 | |
|---|---|---|---|---|---|---|---|---|
|  | Cat. per-cent | Wt. per-cent | Cat. per-cent | Wt. per-cent | Cat. per-cent | Wt. per-cent | Cat. per-cent | Wt. per-cent |
| CdO | 46.0 | 64.3 | 37.0 | 58.1 | 27.0 | 55.7 | 8.0 | 27.9 |
| $BO_{1.5}$ | 0.0 | 0.0 | 10.0 | 2.1 | 40.0 | 11.2 | 76.0 | 33.1 |
| $SiO_2$ | 40.0 | 26.1 | 40.0 | 29.4 | 20.0 | 19.3 | 10.0 | 16.3 |
| $CaF_2$ | 10.0 | 8.5 | 10.0 | 9.5 | 10.0 | 12.6 | 10.0 | 21.2 |
| $AlO_{1.5}$ | 4.0 | 1.1 | 3.0 | 0.9 | 3.0 | 1.2 | 2.0 | 1.4 |

The batches were melted at 1400° C. in the case of glasses Nos. 1 and 2, at 1250° C. in the case of glass No. 3, and at 1300° C. in the case of glass No. 4. When the melts were homogeneous the glasses were poured into stainless steel molds preheated to 500° to 550° C., and finally annealed. The resulting glasses ranged from a pale yellow color in the case of No. 1 through a pale green to colorless.

The neutron absorbing characteristics of these glasses were then determined using radium-beryllium mixtures embedded in paraffin as neutron sources and a $^{10}BF_3$ proportional neutron counter. In each instance after the neutron count had been determined a background count was made to compensate for cosmic ray neutrons. In this manner it was determined that the cadmium equivalents of those glasses, or its reciprocal, the glass equivalent of cadmium, were as follows:

| Glass | Glass Equivalent of Cadmium | Cadmium Equivalent of Glass |
|---|---|---|
| No. 1 | 8.55 | 0.117 |
| No. 2 | 9.81 | 0.102 |
| No. 3 | 8.06 | 0.124 |
| No. 4 | 8.19 | 0.122 |
| No. 5 | 47.6 | 0.0210 |
| No. 6 | 105.3 | 0.00948 |

Glasses 5 and 6 were included for comparison, glass No. 5 being a commercial X-ray absorbing glass, and glass No. 6 a commercial plate glass. From the foregoing table it can be seen that glasses Nos. 1 to 4 in accordance with this invention are much more effective in absorbing neutrons than common glass or X-ray absorbing glass. The data show likewise that glasses Nos. 3 and 4, which are richer in boron than Nos. 1 and 2 are somewhat better than the latter for the absorption of neutrons from the sources used in making these measurements.

The neutron sources used provided a wide band of energy. For that reason cadmium equivalent of glass and the glass equivalent of cadmium for these glasses were calculated based upon thermal neutrons of 0.025 e. v. energy, which showed that for glasses Nos. 1 to 4 the cadmium equivalent of glass varied from about 0.22 to 0.30, while the reciprocal value, i. e., the glass equivalent of cadmium varied from about 3 to about 4.5.

It thus appears that not only are the glasses of this invention practical in that they may be made from low cost, readily available materials that are easily melted to produce colorless, or practically colorless, glasses, but also that in relatively small thicknesses they can be used to replace concrete blocks, cadmium metal, etc., as a neutron shield. Furthermore, experience has shown that glasses Nos. 1 to 3 are of acceptable chemical durability as determined by resistance to steam attack. Glass No. 4 is somewhat more susceptible to moisture attack but may be used for some purposes. Experience has shown likewise that these glasses are not severely discolored upon exposure to intense neutrons, and that if they do become discolored by neutron exposure, the color can be largely restored by mild heat treatment.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. A neutron absorbing glass comprising, by analysis and in weight per cent, from about 1 to 67 per cent CdO, about 40 to 0 per cent of $BO_{1.5}$, about 6 to 28 per cent of $SiO_2$, and the remainder substantially all $CaF_2$, and not over about 5 per cent of other oxides in amounts not productive of opacity or undesirable color, and including a small amount of an oxide to prevent devitrification.

2. A neutron absorbing glass comprising, by analysis, and in weight per cent, from about 1 to 67 per cent CdO, about 40 to 0 per cent of $BO_{1.5}$, about 6 to 28 per cent of $SiO_2$, about 1 to 1.5 per cent of $AlO_{1.5}$, about 2 to 29 per cent of $CaF_2$, and not over about 5 per cent of other oxides in amounts not productive of opacity or undesirable color, and the sum of CdO and $BO_{1.5}$ ranging from 50 to 78 per cent, and the glass having a cadmium equivalent of from about 0.2 to 0.3 with respect to 0.025 e. v. thermal neutrons, and being colorless or only slightly colored.

3. A neutron absorbing glass comprising, by analysis and in weight per cent, from about 1 to 67 per cent of CdO, about 40 to 0 per cent of $BO_{1.5}$, about 6 to 28 per cent of $SiO_2$, about 8 to 29 per cent of $CaF_2$, and about 1 to 1.5 per cent of $AlO_{1.5}$, with not over about 5 per cent of other oxides in amounts not productive of opacity or undesirable color, the amount of CdO increasing as the $BO_{1.5}$ decreases within the foregoing range, and vice versa, the sum of CdO and $BO_{1.5}$ ranging from 50 to 78 per cent, and the glass having a cadmium equivalent of from about 0.2 to 0.3 with respect to 0.025 e. v. thermal neutrons, and being colorless or only slightly colored before exposure to neutron radiation.

4. Neutron absorbing glass melted from a batch supplying, in cationic per cent, from about 8 to 46 per cent of CdO, from about 10 to 40 per cent of $SiO_2$, from about 0 to 70 per cent of $BO_{1.5}$, about 10 per cent of $CaF_2$, and from about 2 to 4 per cent of $AlO_{1.5}$.

5. Neutron absorbing glass melted from a batch supplying, in cationic per cent, about 46 per cent of CdO, about 40 per cent of $SiO_2$, about 10 per cent of $CaF_2$, and about 4 per cent of $AlO_{1.5}$.

6. Neutron absorbing glass melted from a batch supplying, in cationic per cent, about 37 per cent of CdO, about 40 per cent of $SiO_2$, about 10 per cent of $BO_{1.5}$, about 10 per cent of $CaF_2$, and about 3 per cent of $AlO_{1.5}$.

7. Neutron absorbing glass melted from a batch supplying, in cationic per cent, about 27 per cent of CdO, about 20 per cent of $SiO_2$, about 40 per cent of $BO_{1.5}$, about 10 per cent of $CaF_2$, and about 3 per cent of $AlO_{1.5}$.

8. Neutron absorbing glass melted from a batch supplying as essential components, in cationic per cent, from about 8 to 46 per cent of CdO, from about 10 to 40 per cent of $SiO_2$, from about 0 to 70 per cent of $BO_{1.5}$, about 10 per cent of $CaF_2$ and not over about 5 per cent of other oxides in amounts not productive of opacity or undesirable color, and the glass having a cadmium equivalent of from about 0.2 to 0.3 with respect to 0.025 e. v. thermal neutrons, and being colorless or only slightly colored before exposure to neutron radiation.

LABEN M. MELNICK.
HURD W. SAFFORD.
KUAN-HAN SUN.
ALEXANDER SILVERMAN.

References Cited in the file of this patent

UNITED STATES PATENTS

| Number | Name | Date |
|---|---|---|
| 2,435,995 | Armistead | Feb. 17, 1948 |
| 2,439,192 | Sun et al. | Apr. 6, 1948 |
| 2,511,517 | Spiegel | June 13, 1950 |
| 2,517,459 | Armistead | Aug. 1, 1950 |
| 2,523,362 | Fraser et al. | Sept. 26, 1950 |
| 2,584,974 | Armistead | Feb. 12, 1952 |
| 2,584,975 | Armistead | Feb. 12, 1952 |
| 2,606,841 | Armistead | Aug. 12, 1952 |

OTHER REFERENCES

Serial No. 395,364, Berger et al. (A. P. C.), published May 11, 1943.